(12) United States Patent
Yang

(10) Patent No.: US 6,527,560 B2
(45) Date of Patent: Mar. 4, 2003

(54) PERIPHERAL WITH EXPANSION CONNECTOR ATTACHABLE TO HOST

(76) Inventor: Tai-Her Yang, No. 59, Chung Hsing 8 St., Si-Hu Town, Dzan-Hwa (TW)

( * ) Notice: Subject to any disclaimer, the term of this patent is extended or adjusted under 35 U.S.C. 154(b) by 165 days.

(21) Appl. No.: 09/791,823

(22) Filed: Feb. 26, 2001

(65) Prior Publication Data

US 2002/0119705 A1 Aug. 29, 2002

(51) Int. Cl.⁷ ................................................ H01B 29/00
(52) U.S. Cl. .................. 439/43; 439/638; 361/686; 361/683; 361/684; 364/708.1
(58) Field of Search .............. 439/43–54, 638, 439/639, 650–654; 200/51 R–51.17; 361/686, 683, 684; 364/708.1

(56) References Cited

U.S. PATENT DOCUMENTS 4,744,006 A * 5/1988 Duffield
5,459,637 A * 10/1995 Ma et al.
5,592,362 A * 1/1997 Ohgami et al.
5,594,621 A * 1/1997 Van Rumpt
5,627,728 A * 5/1997 Ma et al.
5,689,400 A * 11/1997 Ohgami et al.
5,729,478 A * 3/1998 Ma et al.
5,796,579 A * 8/1998 Nakajima et al.
6,008,985 A * 12/1999 Lake et al.

* cited by examiner

Primary Examiner—Gary Paumen
(74) Attorney, Agent, or Firm—Bacon & Thomas

(57) ABSTRACT

A peripheral with expansion connector that is attachable to a host, comprised of an interface connector (or a plug-socket unit) is provided to connect to an interface connector (or a plug-socket unit) from the host; a subsidiary I/O interface connector (or a plug-socket), a dedicated interface circuit, and a selection switch to connect both of said interface connector (or plug-socket unit) to the dedicated interface circuit or to the subsidiary I/O interface connector (or plug-socket unit).

5 Claims, 5 Drawing Sheets

PERIPHERAL WITH EXPANSION CONNECTOR ATTACHABLE TO HOST

BACKGROUND OF THE INVENTION (a) Field of the Invention

The present invention relates a peripheral with expansion connector attachable to a host, and more particularly, to one provided with input for dedicated interface circuit to couple to the host and an selection switch to switch between input contact and output connector.

(b) Description of the Prior Art

The prior art of a peripheral attachable to a computer host must be removed when connection to any other interface is required. To improve computer use convenience, the present invention of a peripheral is provided with additional expansion connector and a selection switch so to make connection with other interface for the host possible without removing the peripheral using the expansion connector.

SUMMARY OF THE INVENTION

The present invention relates to a peripheral provided with expansion connector attachable to a host and contains an interface connector (or a plug-socket unit) P1 to be connected to an interface connector (or a plug-socket unit) P0 from the host, a subsidiary I/O interface connector (or plug-socket unit) P2; a dedicated interface circuit C100 and an selection switch SL100 to conduct through said interface connector (or plug-socket unit) P1 either to said dedicated interface circuit C100 or the subsidiary I/O interface connector (or the plug-socket unit)P2.

DETAILED DESCRIPTION OF THE PREFERRED EMBODIMENTS

A peripheral provided with expansion connector attachable to a host of the present invention is essentially comprised of a wired peripheral provided with an interface connector (or a plug-socket unit) P1 connected to an interface connector (or a plug-socket unit) P0 from the host, and the peripheral is attachable or detachable to and from the host by means of a tennon, screw, or magnet structure. A subsidiary I/O interface connector (or plug-socket unit) P2, a dedicated interface circuit C100 and an selection switch SL100 to conduct through said interface connector (or plug-socket unit) P1 and said dedicated interface circuit C100 are provided inside the peripheral. When said P1 and C100 are conducted through, the P1 is disconnected from said subsidiary I/O interface connector (or plug-socket unit) P2 to drive the corresponding dedicated interface circuit C100; or to conduct through the interface connector (or plug-socket unit) P1 and the subsidiary I/O interface connector (or plug-socket unit) P2 by switching, thus to disconnect from the dedicated interface circuit C100. Consequently, the interface connector (or plug-socket unit) P0 from the host passes through the subsidiary I/O interface connector (or plug-socket unit) P2 via the interface connector (or plug-socket unit) P1 and the selection switch SL100.

The peripheral provided with expansion connector attachable to the host relates to a wired peripheral that can be attached to or detached from the host by means of a tennon, screw or magnetic structure. Additional to the dedicated interface circuit and housing, the peripheral is essentially comprised of an interface connector (or a plug-socket set) P1 coupled to an interface connector (or a plug-socket set) P0 from the host; one or more than one set of subsidiary I/O interface connector (or plug-socket unit) P2 and a selection switch SL 100 for the interface connector (or the plug-socket unit) P1 to connect through the subsidiary I/O interface connector (or the plug-socket unit) P2 or for the interface connector (or the plug-socket unit) P1 to connect through the dedicated interface circuit C100.

Figure 1:
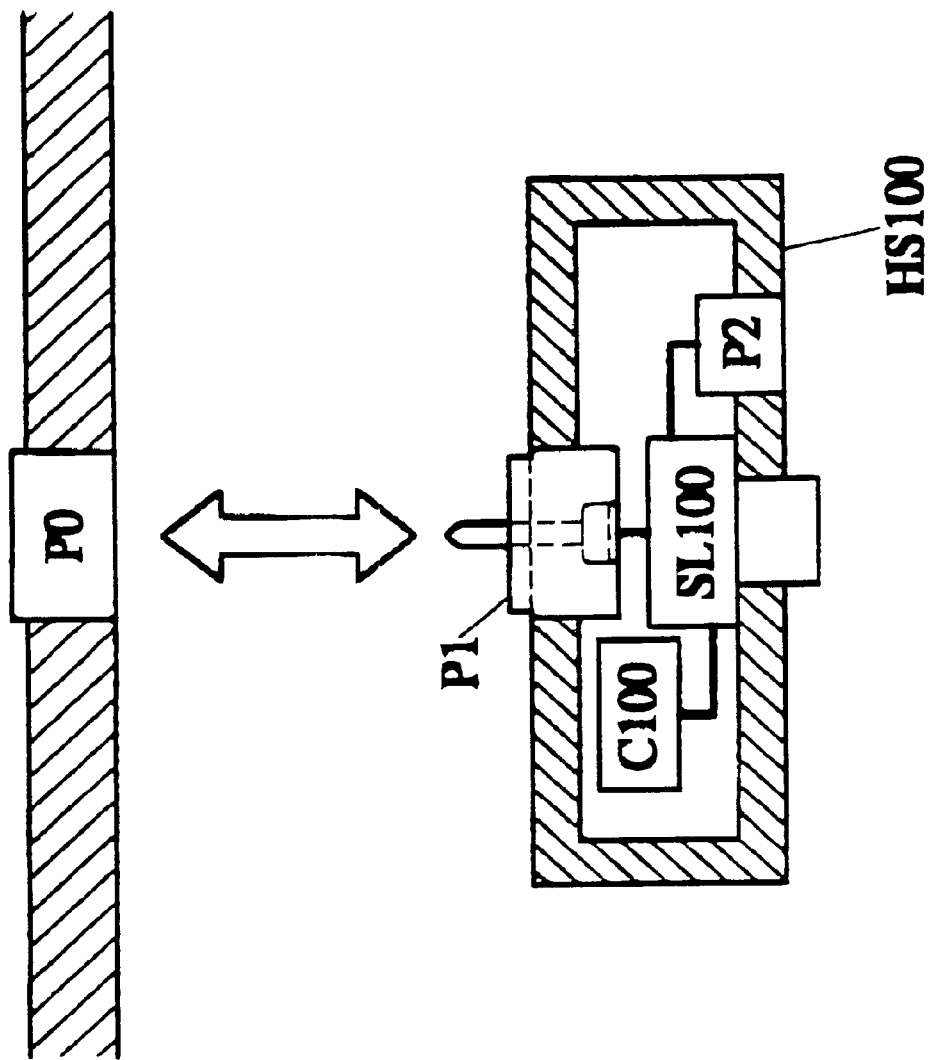
FIG. 1 is a block chart of a basic circuit of the present invention.

As illustrated in FIG. 1 showing a block chart of a basic circuit of the peripheral provided with expansion connector attachable to the host is essentially comprised of a housing HS100, made of plastic by molding injection, or cast alloy or metallic material or other materials to accommodate the dedicated circuit C100, the interface connector (or the plug-socket unit) P1, one or more than one set of subsidiary I/O interface connector (or the plug-socket unit) P2, and the selection switch SL100 for the interface connector (or the plug-socket unit) P1 to select to connect through the dedicated circuit C100, the interface connector (or the plug-socket unit) P1, or to the subsidiary I/O interface connector (or the plug-socket unit) P2; and a tennon, screw or magnet structure for the peripheral to be incorporated to the host.

Within, said interface connector (or the plug-socket unit) P1 is comprised of one that meets the specification of SERIAL, PS2, USB, IEEE1394 or other selected specification for connection to the interface connector (or the plug-socket unit) P0 from the host.

Depending on the properties of the selected interface device, the dedicated interface C100 relates to a solid-state electronic circuit or electromechanical circuit, such as a receiving circuit functioning as a receiver or other interface circuit dedicated to the peripheral.

The subsidiary I/O interface connector (or the plugsocket unit) P2 relates to one or more than one set of connector meeting SERIAL, PS2, USB, IEEE1394 or other selected specifications to connect to other wired peripheral.

The selection switch SL100 relates a distributed type of selection switch comprised of electromechanical or solid-state circuit device to switch the interface connector (or the plug-socket) P1 to connect to the dedicated interface circuit ClOO or to the subsidiary I/O interface connector (or the plug-socket unit) P2. Depending on the transmission nature of the type of the interface circuit, such as SERIAL, PS2, USB, IEEE1394 or other type selected, the selection switch SL100 may be or may not be provided.

Furthermore, an additional charging set can be provided to the peripheral provided with expansion connector that can be attached to the host, so to take advantage of the power supply from the host to charge itself for the use by any adapted wireless device.

Figure 2:
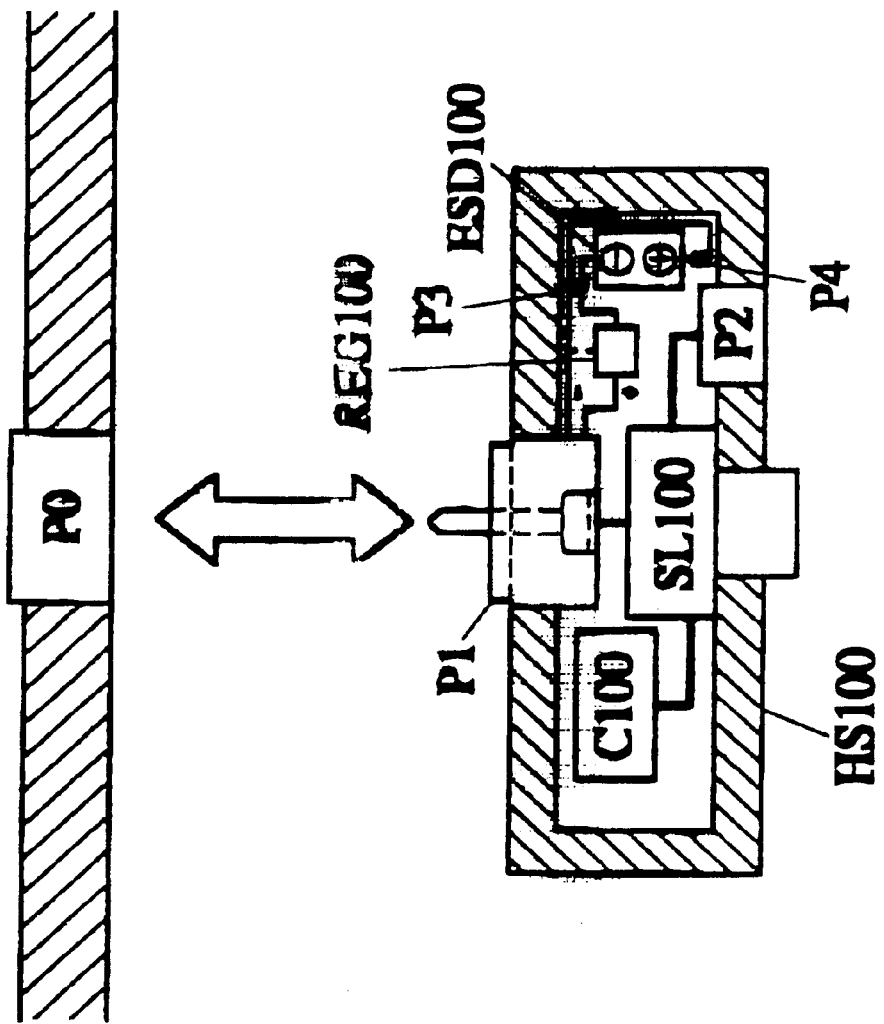
FIG. 2 is a schematic view showing a preferred embodiment of the present invention provided with a concurrent charging set.
Figure 3:
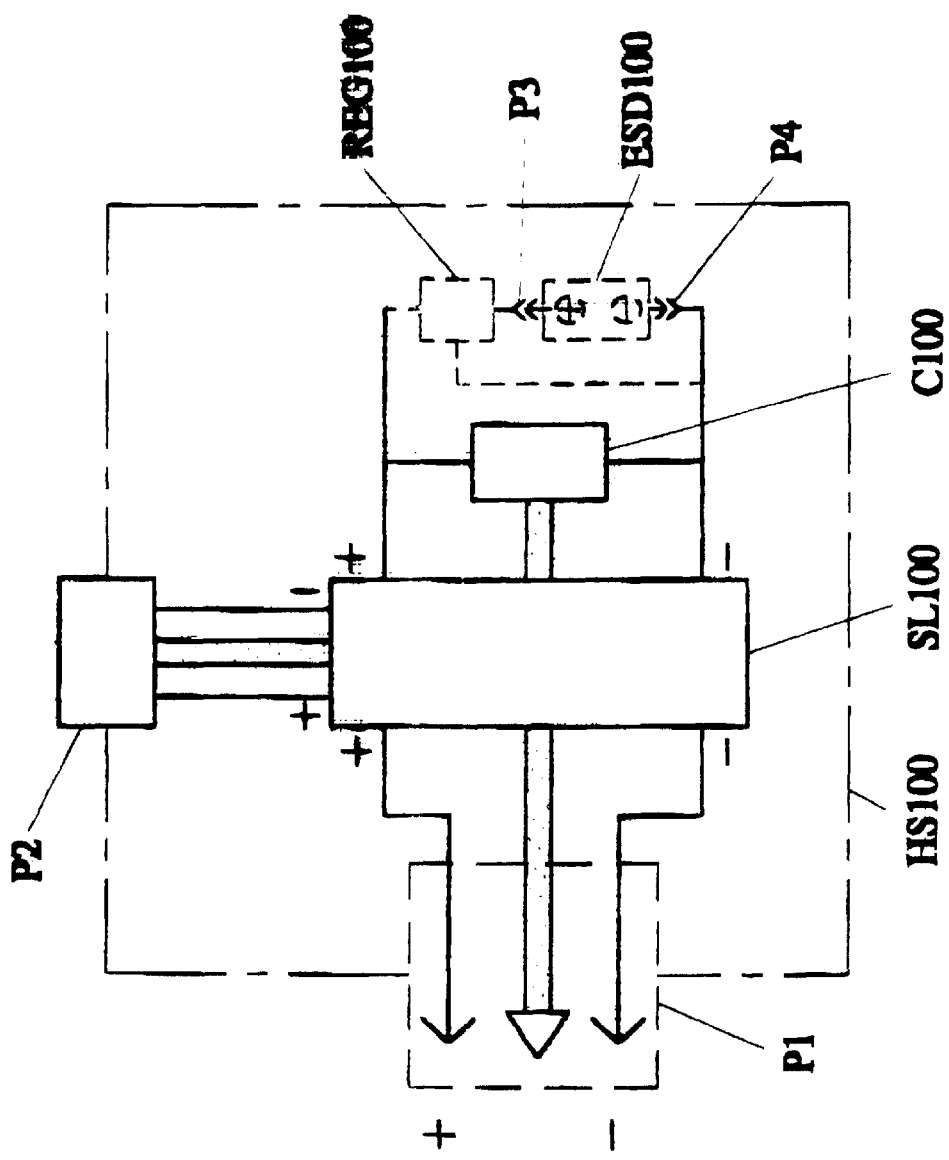
FIG. 3 is a block chart showing a circuit layout of the present invention.

FIG. 2 shows a schematic view of a preferred embodiment of the present invention provided with a concurrent charging set and FIG. 3 shows a block chart of a circuit layout of the present invention. Within, both of positive and negative sources in the dedicated interface circuit C100 are made in series (or in parallel) to provide a charging control and display circuit REG100 comprised of an electromechanical or solid-state electronic device. Then the circuit REG100 is further made in parallel with charging connectors (or plug-socket units) P3 and P4 for the circuit of the same polarity to become in parallel and be placed into a battery unit ESD100 comprised of a recharging and discharging secondary battery, or capacitor or ultra-capacitor. Said ESD100 to receive power supplied from the host, to operate and control of charging voltage/current, and to display its charging status.

Figure 4:
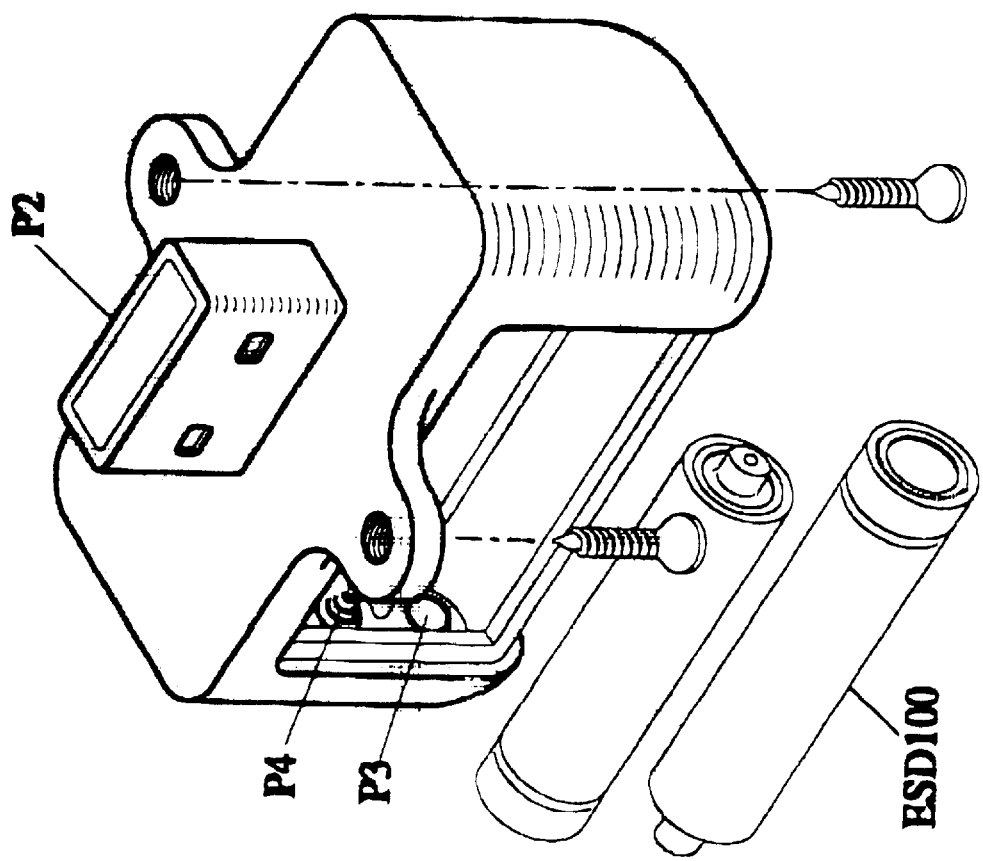
FIG. 4 is an elevation view showing the appearance of the present invention.
Figure 5:
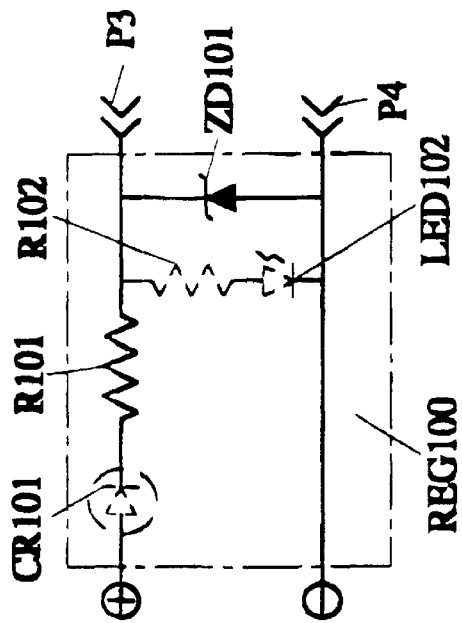
FIG. 5 is a view showing an example of a voltage regulator using a zener diode for drop in the present invention.
Figure 6:
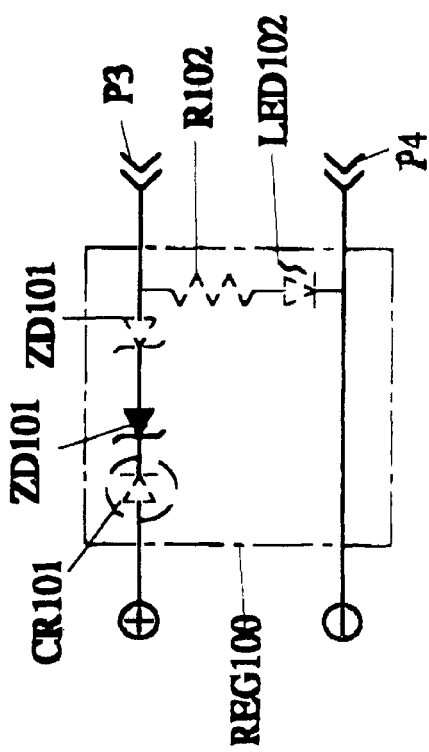
FIG. 6 is a view showing an example of a circuit of the voltage regulator having illumination and drop functions of the present invention.

FIG. 4 shows an elevation view of the appearance of the present invention and FIG. 5 is a view showing an example of a circuit of a voltage regulator of the present invention. For the circuit to provide drop and charging status display functions at the same time, a zener diode ZD101, is directly connected in series with an output end with the zener voltage functioning as a drop value between the source and the output interface. The purpose can be also achieved, as illustrated in FIG. 6, showing another example of a voltage regulator circuit, which is capable of light emitting and drop, of the present invention. Within, the zener diode ZD101 (or more than one zener diodes ZD101 connected in series or parallel), the light emitting diode LED101 (or more than one light emitting diodes connected in series or parallel) with illumination and drop effects and the limit resistance R102 are connected in series. In both cases, depending on the purpose of the application, an additional diode CR101 for separation may be added also in series at the input end. Or a charging status display circuit comprised of a light emitting diode LED102 and a limit resistance R102 to be connected at the output end for drop and charging status display.

Figure 7:
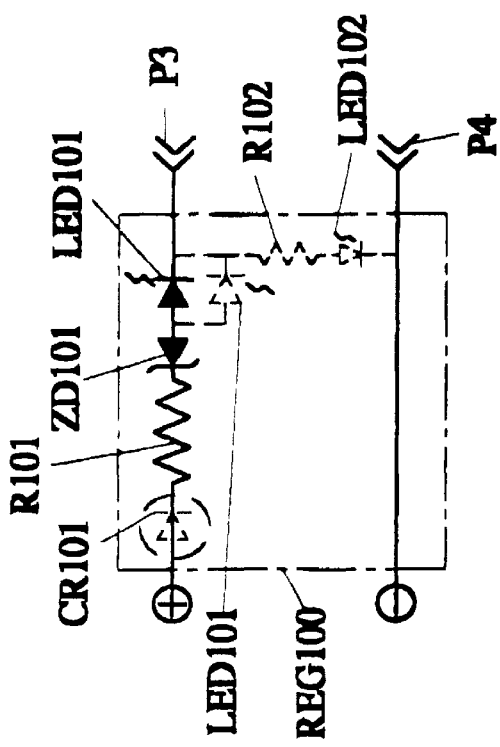
FIG. 7 is a view showing an example of the circuit of the voltage regulator comprised of limit resistance and zener diode for stabilized voltage output.

Taking another example yet as illustrated in FIG. 7, a voltage regulator for stabilized voltage output of the present invention is comprised of the limit resistance R101 and the zener diode ZD101. Within, the limit resistance R101 is connected in series between the source and the output interface while the zener diode ZD101 is connected in parallel between both ends of the output interface for to output stabilized voltage. Depending on the purpose of the application, the separation diode CR101 may be added at the input end or a charging status display circuit, comprised of the light emitting diode LED102 and the limit resistance R102 connected in series, may be connected in parallel at the output end.

The peripheral with expansion connector that is attachable to the host of the present invention as disclosed above provides flexible adaptation and fixation of the subsidiary I/O interface connector (or the plug-socket unit) to facilitate its control and operation without having to always carry it along when not used.

What is claimed is:

1. A peripheral provided with expansion connector attachable to a host and contains an interface connector (or a plug-socket unit) P1 to be connected to an interface connector (or a plug-socket unit) P0 from the host, a subsidiary I/O interface connector (or plug-socket unit) P2; a dedicated interface circuit C100 and an selection switch SL100 to conduct through said interface connector (or plug-socket unit) P1 either to said dedicated interface circuit C100 or the subsidiary I/O interface connector (or the plug-socket unit) P2, essentially comprised of:

a housing HS100, made of plastic by molding injection, or cast alloy or metallic material or other materials to accommodate the dedicated circuit C100, the interface connector (or the plug-socket unit) P1, one or more than one set of subsidiary I/O interface connector (or the plug-socket unit) P2, and the selection switch SL100 for the interface connector (or the plug-socket unit) P1 to select to connect through the dedicated circuit C100, the interface connector (or the plug-socket unit) P1, or to the subsidiary I/O interface connector (or the plug-socket unit) P2; and a tennon, screw or magnet structure for the peripheral to be incorporated to the host;

an interface connector (or the plug-socket unit) P1, for connection to the interface connector (or the plug-socket unit) P0 from the host;

a dedicated interface C100, solid-state electronic circuit or electromechanical circuit such as a receiving circuit functioning as a receiver or other interface circuit dedicated to the peripheral, depending on the properties of the selected interface device;

a subsidiary I/O interface connector (or the plug-socket unit) P2, to connect to other wired peripheral; and a selection switch SL100, relates a distributed type of selection switch comprised of electromechanical or solid-state circuit device to switch the interface connector (or the plug-socket) P1 to connect to the dedicated interface circuit C100 or to the subsidiary I/O interface connector (or the plug-socket unit) P2.

2. A peripheral with expansion connector that is attachable to the host as claimed in claim 1, comprised of a concurrent charging set having positive and negative sources in the dedicated interface circuit C100 in series (or in parallel); a charging control and display circuit REG100 comprised of an electromechanical or solid-state electronic device; two charging connectors (or plug-socket units) P3 and P4 in parallel with the charging control and display circuit REG100 in parallel, and a battery unit ESD100 having a recharging and discharging secondary battery, or capacitor or ultra-capacitor to receive power supplied from the host to display the operation of charging voltage/current and the charging status through the charging control and display circuit REG100.

3. A peripheral with expansion connector that is attachable to the host as claimed in claim 1, within, said charging control and display circuit REG100 is comprised of a zener device connected in series with output end using its zener voltage value as that of a drop between source and output interface; or a separation diode CR101 connected in series at input end or a charging status display circuit comprised of a light emitting diode LED102 connected in series with a limit resistance R102 connected in parallel at output end is added to provide drop and charging status display at the same time depending on the purpose of the application.

4. A peripheral with expansion connector that is attachable to the host as claimed in claim 1, within the charging control and display circuit REG100 is comprised of the zener diode ZD101 (or more than one zener diodes ZD101 connected in series or parallel), the light emitting diode LED101 (or more than one light emitting diodes connected in series or parallel) with illumination and drop effects and the limit resistance R102 are connected in series, and a separation diode CR101 connected in series at input end or a charging status display circuit comprised of a light emitting diode LED102 connected in series with a limit resistance R102 connected in parallel at output end is added to provide drop and charging status display at the same time depending on the purpose of the application.

5. A peripheral with expansion connector that is attachable to the host as claimed in claim 1, within the charging control and display circuit REG100 is comprised of the limit resistance R101 connected in series between the source and the output interface while the zener diode ZD101 is connected in parallel at both ends of the output interface to output stabilized voltage, and a separation diode CR101 connected in series at input end or a charging status display circuit comprised of a light emitting diode LED102 connected in series with a limit resistance R102 connected in parallel at output end is added to provide drop and charging status display at the same time depending on the purpose of the application.

* * * * *